Patented May 14, 1935

2,001,448

UNITED STATES PATENT OFFICE 2,001,448

MANUFACTURE OF ARTIFICIALLY COLORED GRANULES

Milton R. Beasley, Norwood, Mass., assignor to Bird & Son, Inc., East Walpole, Mass., a corporation of Massachusetts No Drawing. Application May 2, 1934, Serial No. 723,545

9 Claims. (Cl. 91—70)

This invention relates to the manufacture of artificially colored granules and has to do principally with such granules for use in the provision of a mineral surfaced roofing, though such granules are useful for various other purposes.

Heretofore, various workers in the art have dealt with the manufacture of artificially colored granules, including those having a fused silicate constituent in the surface coating thereof. In the granules manufactured, however, in accordance with the prior art methods, under certain moisture and temperature conditions, undesirable surface efflorescence or blooming takes place which affects not only the appearance but, in addition, the adherence of granules to an asphalt roofing, for example, which affects adversely both its appearance and life. Efforts have been made to minimize such blooming by providing a high reactive granule, that is, a granule reactive with silicate of soda. A high kiln temperature also aids in eliminating blooming but is both expensive and impractical, particularly if it is attempted to carry such temperatures to an extreme, e. g. 1500° F. or higher. Moreover, the blooming or leaching of the free sodium or sodium salts continues after the granules have been put into use with resultant dissatisfaction with the roofing product. The herein described invention avoids the difficulties of the prior art and has the advantages of eliminating blooming (apparently because the granules of this invention are substantially free from free sodium or water-soluble salts thereof), the fixation of a durable insoluble silicate coating of uniform coverage and color at a low cost and which is easy to apply in practice. Moreover, a granule highly reactive with silicate of soda, is not required.

The improved method of this invention of manufacture of the novel colored granules with their insoluble silicate coating is as follows: there is first provided as a base for the colored granules, particles of material, whether natural or artificial, sufficiently heat resistant to withstand the heat incident to a fusing of the glaze thereon. There may be employed, for example, particles of sand, gravel, rock, blast-furnace slags, or burned clay or shale, including crushed brick or the like. In the practice of the process the particles are first mixed with a hydrous plastic clay in either wet or dry condition and sufficiently tumbled or agitated therewith so that the clay preferably entirely coats or covers the exterior surfaces of the particles. To the clay any suitable coloring pigment may be added. The particles thus coated, may be dried and then supplied with a coating of a silicate of soda to which any suitable coloring material may be added though the coloring material may, as just mentioned, be mixed with the clay instead. It is also contemplated that this process may also be practiced to produce the novel granules of this invention, without the use of any pigment so that the base is supplied with a substantially clear colorless glaze. The after-applied sodium silicate reacts with the clay to form in situ complex calcium and/or aluminum sodium silicates which are insoluble and tend to set up and become very viscous and firm. The granules thus supplied with the two coats of material may be first dried and then run through the kiln, or run directly through the kiln, wherein they are heated to a temperature of from 450 to 1200° F. (preferably 900°–1100° F.) which both accelerates the chemical reaction between the clay and silicate of soda, and fuses the same so that the granules on their exterior surfaces are thus provided with the desired colored glaze, or, as heretofore mentioned, by leaving out the pigment, with a clear glaze. Proportions which have been found entirely suitable in the preferred practice of the invention are as follows:

| | Parts |
|---|---|
| Granules | 80 |
| Kaolin or china clay | 2.25 |
| Silicate of soda (approximately 40° Bé.) | 2.25 |
| Pigment (e. g. chrome oxide) | .55 |

It is found in practice that these proportions are not at all critical and, in certain cases, that the amount of clay may be cut down substantially, though ordinarily, in such case, the amount of silicate of soda is increased somewhat. The temperatures above given are found in practice to be entirely successful though normally the temperature is carried to 1000° or thereabouts in order to secure the best results.

Though in the commercial practice of this invention only sodium silicate is employed, it is contemplated that a chemically equivalent silicate, such as potassium silicate, may be substituted therefor and accordingly come within the scope of the appended claims.

Having described my invention I claim:

1. The method of coloring granules of the class described which consists in first coating the same with a hydrous plastic clay, then applying to the granules thus coated, a second coating including sodium silicate, one of said coatings having therein a coloring pigment, and finally heating said granules to a temperature sufficiently high to react said coatings in situ inter se and produce on said particles an insoluble colored exterior glaze.

2. The method of coloring granules of the class described which consists in first coating the same with a hydrous plastic clay, then applying to the granules thus coated, a second coating including sodium silicate, one of said coatings having therein a coloring pigment, and finally heating said granules to a temperature in excess of 450° F. to react said coatings in situ inter se and produce on said particles an insoluble colored exterior glaze.

3. The method of coloring granules of the class described which consists in first coating the same with a hydrous plastic clay, then applying to the granules thus coated, a second coating including sodium silicate, one of said coatings having therein a coloring pigment, and finally heating said granules to a temperature between 450 and 1000° F. to react said coatings in situ inter se and produce on said particles an insoluble colored exterior glaze.

4. The method of coloring granules of the class described which consists in first coating the same with a hydrous plastic clay, then applying to the granules thus coated, a second coating including sodium silicate, one of said coatings having therein a coloring pigment, and finally heating said granules to a temperature between 450 and 1200° F. to react said coatings in situ inter se and produce on said particles an insoluble colored exterior glaze.

5. The method of coating granules of the class described which consists in first coating the same with a hydrous plastic clay, then applying to the granules thus coated, a second coating including sodium silicate, and finally heating said granules to a temperature sufficiently high to react said coatings in situ inter se and produce on said particles an insoluble exterior glaze.

6. The method of coating granules of the class described which consists in first coating the same with a hydrous plastic clay, then applying to the granules thus coated, a second coating including sodium silicate, and finally heating said granules to a temperature in excess of 450° F. to react said coatings in situ inter se and produce on said particles an insoluble exterior glaze.

7. The method of coating granules of the class described which consists in first coating the same with a hydrous plastic clay, then applying to the granules thus coated a second coating including sodium silicate, and finally heating said granules to a temperature sufficiently high to react said coatings in situ inter se and produce on said particles an insoluble exterior glaze, the major portion of which glaze consists of the reaction product of said clay and said silicate.

8. As a new article of manufacture, roofing granules of the class described having on the exterior thereof a substantially non-blooming insoluble glaze coating, said coating consisting substantially of the reaction product of hydrous plastic clay and sodium silicate, and being substantially free from water-soluble salts of sodium.

9. As a new article of manufacture, roofing granules of the class described having on the exterior thereof a substantially non-blooming insoluble colored glaze coating, said coating consisting substantially of pigment and the reaction product of hydrous plastic clay and sodium silicate, and being substantially free from water-soluble salts of sodium.

MILTON R. BEASLEY.